(12) United States Patent
Ariyasu et al.

(10) Patent No.: US 6,262,165 B1
(45) Date of Patent: Jul. 17, 2001

(54) POLYACETAL RESIN COMPOSITION

(75) Inventors: Hideyuki Ariyasu, Fujisawa; Hironori Tsuji, Fuchu, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/380,567

(22) PCT Filed: Mar. 6, 1998

(86) PCT No.: PCT/JP98/00934

§ 371 Date: Sep. 7, 1999

§ 102(e) Date: Sep. 7, 1999

(87) PCT Pub. No.: WO98/39387

PCT Pub. Date: Sep. 11, 1998

(30) Foreign Application Priority Data

Mar. 7, 1997 (JP) .................................... 9-052891

(51) Int. Cl.⁷ ...................................... C08K 3/03
(52) U.S. Cl. ............................... 524/496; 524/495
(58) Field of Search ..................... 524/495, 496

(56) References Cited

U.S. PATENT DOCUMENTS

| 3,340,219 | 9/1967 | Stemmler et al. . |
| 4,831,073 | 5/1989 | Okushiro et al. . |
| 5,373,046 | * 12/1994 | Okamura et al. ............ 524/413 |

FOREIGN PATENT DOCUMENTS

| 0453218A1 | 10/1991 | (EP) . |
| 46-31020B | 9/1971 | (JP) . |
| 49-037946A | 4/1974 | (JP) . |
| 62-267351 | 11/1987 | (JP) . |
| 63-210161 | 8/1988 | (JP) . |
| 2-77442 | 3/1990 | (JP) . |
| 3-296557A | 12/1991 | (JP) . |
| 6-240049 | 8/1994 | (JP) . |
| 6-329872 | 11/1994 | (JP) . |
| 8-279373 | 10/1996 | (JP) . |

* cited by examiner

Primary Examiner—Edward J. Cain
(74) Attorney, Agent, or Firm—Birch, Stewart, Kolasch & Birch, LLP

(57) ABSTRACT

A polyacetal resin composition which comprises (A) 100 parts by weight of a polyacetal resin, (B) 1.0–30 parts by weight of an electrically conductive carbon black, and (C) 1.0–30 parts by weight of a carbon fiber of 120–350 μm in average fiber length.

19 Claims, No Drawings

POLYACETAL RESIN COMPOSITION

This application is the national phase under 35 U.S.C. §371 of PCT International Application No. PCT/JP98/00934 which has an International filing date of Mar. 6, 1998, which designated the United States of America.

TECHNICAL FIELD

The present invention relates to a polyacetal resin composition which is excellent in electrical conductivity, mechanical properties and releasability, and a method for producing the composition. Particularly, it relates to a polyacetal resin composition used for automobile components, and a molded article.

BACKGROUND OF THE INVENTION

Polyacetal resins are widely used, for example, as a component of automobile parts, electronic and electrical parts, and working parts or exterior parts of other industrial apparatuses because of their excellent mechanical strength, creep characteristics, lubrication characteristics, and electric characteristics. However, when polyacetal resins are used as a component in bracketing materials for in-tank type fuel pump apparatuses as disclosed, for example, in JP-A-8-279373, the resin is simultaneously required to have the properties of electrical conductivity for the inhibition of static electricity formation caused by contact with fuel, high mechanical strength for operation at high pump pressure, and excellent releasability for smooth releasing from molds of complicated shapes produced by injection molding.

The following prior art teaches polyacetal resins having improved electrical conductivity characteristics. JP-A-63-210162 discloses a composition comprising a polyoxymethylene resin, a specific carbon black, and an epoxy compound, but this composition only has improved antistatic properties, not improved mechanical properties.

JP-A-49-37946 discloses compositions comprising a polyacetal resin containing a carbonaceous carbon fiber, and mentions, in the examples, that the fiber length of the carbon fiber in the injection molded products is in the range of 0.10–0.20 mm, and the electrical conductivity improves as the amount of the carbon fiber contained therein increases. It further discloses that mechanical strength, elastic modulus and frictional characteristics of the compositions are equal to or higher than those of polyacetal. However, the compositions have high anisotropy, and when they are injection molded (especially when they are molded into relatively large articles such as brackets of in-tank type fuel pump apparatuses). They show non-uniform shrinking behavior in the mold resulting in clamping of the mold and deterioration of releasability from the mold.

JP-A-62-267351 discloses a polyacetal resin composition containing one or two or more of carbon materials selected from the group consisting of carbon black, carbon fiber and graphite in an amount of 0.1–30% by weight based on the whole composition and one or two or more compounds selected from the group consisting of alkali metal compounds and alkaline earth metal compounds in an amount of 0.0005–2% by weight based on the whole composition. The publication states that the heat stability of the polyacetal resin containing the carbon materials is improved by the addition of the alkali metal compounds and/or the alkaline earth metal compounds, but makes no mention of the examples where they are used in combination, and fails to disclose excellent effects in all of the electrical conductivity, the mechanical properties and the releasability as attained in the present invention.

JP-A-6-240049 discloses a thermoplastic resin composition comprising a carbon fiber of 1–6 $\mu$m in diameter contained in an amount of 3–30 wt % in the thermoplastic resin and carbon black contained in an amount of 0–20 wt % in the thermoplastic resin. As the thermoplastic resin, a polyoxymethylene resin is mentioned, and examples including it are given, but all of the examples use only carbon fiber as the carbon material. Thus, naturally, the effects obtained in the present invention are not shown.

SUMMARY OF THE INVENTION

As a result of an intensive research conducted by the inventors in an attempt to provide polyacetal resin compositions which have excellent electrical conductivity, mechanical properties and releasability, and the molded articles obtained by molding the polyacetal resin compositions, (especially as automobile components), it has been found that the above objects can be attained by using a polyacetal resin, an electrically conductive carbon black, and a carbon fiber of 120–350 $\mu$m in average fiber length, and, if necessary, a lubricant.

That is, the present invention relates to a polyacetal resin composition comprising (A) 100 parts by weight of a polyacetal resin, (B) 1.0–30 parts by weight of an electrically conductive carbon black, and (C) 1.0–30 parts by weight of a carbon fiber of 120–350 $\mu$m in average fiber length, and, if necessary, 0.001–5 parts by weight of a lubricant.

The present invention further relates to a method for producing a polyacetal resin composition which comprises melting a polyacetal resin, adding simultaneously 1.0–30 parts by weight of an electrically conductive carbon black and 1.0–30 parts by weight of a carbon fiber to 100 parts by weight of the molten polyacetal resin, and kneading them.

The present invention further relates to molded articles obtained by molding the above composition, particularly as automobile components.

DETAILED DESCRIPTION OF THE INVENTION

The polyacetal resins used in the composition of the present invention include oxymethylene homopolymers prepared by polymerizing formaldehyde, or cyclic oligomers such as trioxans which are trimers of formaldehyde or tetraoxans which are tetramers of formaldehyde and then capping the end of the resulting polymers with an ether group or an ester group, and oxymethylene copolymers obtained by copolymerizing formaldehyde, trioxans or tetraoxans with cyclic ethers such as ethylene oxide, propylene oxide, 1,3-dioxolane, and 1,4-butanediol formal; these oxymethylene homopolymers or copolymers into which a crosslinkage or a branched molecular chain is introduced; and oxymethylene block copolymers containing a segment comprising an oxymethylene unit and a segment of different component, the end of which is capped with an ether group or an ester bond. Preferred are oxymethylene homopolymers and oxymethylene copolymers obtained by using ethylene oxide or 1,3-dioxolane as a comonomer component. More preferred are oxymethylene copolymers obtained by using ethylene oxide or 1,3-dioxolane as a comonomer component.

Melt index (hereinafter referred to as "MI") of the polyacetal resins is not limited, but preferred are those which can stand the usual molding processes and have the mechanical strength inherent to the polyacetal resins. In the composition of the present invention, MI is preferably 0.1–200 g/10 min, and more preferably 0.1–120 g/10 min. The melt index here is measured in accordance with ASTM-D1238 at a temperature of 190° C. and under a load of 2160 g and expressed by the unit of g/10 min.

The electrically conductive carbon blacks used in the present invention are not limited, but preferred are those which are small in particle size or large in the surface area per unit weight and developed in a chain structure.

The surface area per unit weight of an electrically conductive carbon black is usually measured using the absorption of dibutyl phthalate (hereinafter referred to as "DBP") oil. In the present invention, an electrically conductive carbon black having a DBP oil absorption of 200 ml/100 g or more is preferred. This DBP oil absorption is a measure which indicates the degree of development of structure of carbon black, and the DBP oil absorption increases as the structure develops, and the electrical conductivity increases. The DBP oil absorption can be obtained by subjecting a given amount of carbon black, which agitated by a kneader mixer, to titration with DBP using an automatic burette. That is, in this titration, when carbon black is filled with DBP in its voids absorbs the DBP to a maximum, powders which freely flow until then become semi-plastic to cause an abrupt increase in torque of the kneader, and the amount (ml) of DBP per 100 g of carbon black required at this time is measured and recorded as DBP absorption (mg/100 g). This DBP absorption is recognized as a structure index of ASTM D2415-65T.

The electrically conductive carbon blacks which are preferred in the composition of the present invention include, for example, Ketzen Black EC (manufactured by Lion Akzo Co., Ltd.; DBP absorption: 380 ml/100 g), Ketzen Black ECDJ-600 (manufactured by Lion Akzo Co., Ltd.; DBP absorption: 480 ml/100 g), Brintex XE2 (manufactured by Degussa, Inc.; DBP absorption: 370 ml/100 g), etc.

Quality of the carbon fiber is not limited, and any of carbonaceous, graphitic and other carbon fibers can be used, but carbonaceous fibers are preferred. Starting materials for the carbon fibers include rayon, polyacrylonitrile, etc., and since there is no limitation therefor, carbon fibers produced from any starting materials can be used. Furthermore, the carbon fibers may be subjected to any suitable surface treatments as far as attainment of the object of the present invention is not hindered. Preferably, the carbon fibers are subjected to a surface treatment with general sizing agents. There is no limitation in the shape of the carbon fibers. There may be used those of any shapes, such as long fibers, tow fibers, short fibers cut to various lengths, or ground fibers. Diameter of the carbon fibers has no limitation, but is preferably 4–20 $\mu$m.

An embodiment of the present invention is further concerned with the average fiber length of the carbon fiber dispersed in a polyacetal resin composition comprising a polyacetal resin, an electrically conductive carbon black, and a carbon fiber, the mixing ratio of these components, and the method for mixing the components.

A mixture of a polyacetal resin and a carbon fiber is excellent in electrical conductivity and mechanical properties, and the electrical conductivity tend to increase with an increase in the amount of the carbon fiber. However, in case a relatively large molded article is produced by injection molding, this mixture shows a non-uniform shrinking behavior in the mold due to its anisotropy and, hence, has inferior removability (releasability) from the mold. This releasability depends on the amount of the carbon fiber, and deteriorates with increasing amounts of carbon fiber. In order to overcome this defect, it seems apparent that adding the electrically conductive carbon black in a large amount to improve the electrical conductivity and to reduce the amount of the carbon fiber, would result in a high releasability. However, in the case of a polyacetal resin composition comprising a polyacetal resin to which are added an electrically conductive carbon black and a carbon fiber, the skilled artisan would never have expected that it is not the kinds and the amounts of the components dispersed in the composition, but the average fiber length of the dispersed carbon fiber which greatly affects the electrical conductivity. Particularly having an average fiber length in the range of 120–350 $\mu$m exhibits an excellent improvement in the electrical conductivity.

It has become clear that if the average fiber length is less than 120 $\mu$m, there is a conspicuous decrease seen in the flexural modulus and tensile strength, and if the average fiber length exceeds 350 $\mu$m, the electrical conductivity considerably deteriorates. The reason has not yet been completely elucidated, but the electrically conductive carbon black causes a decrease in the affinity between carbon fibers and the polyacetal resin, thus a decrease in strength is supposed to occur. Also, when the fiber length of carbon fiber is short, the resistance against external forces lowers, and when the carbon fiber is too long, the deterioration in electrical conductivity is supposed to occur due to the hindrance in either the development of the structure of the electrically conductive carbon black or the number of fibers per unit volume decreases. The average fiber length of the carbon fibers is preferably in the range of 150–300 $\mu$m.

The method for adjusting the average fiber length of the carbon fibers includes, for example, a method of using carbon fibers whose length is previously made even and a method of adjusting the fiber length of the carbon fibers in the composition to the fiber length of the present invention by adjusting the extrusion conditions such as the screw pattern and the revolution speed of the axis of extruder using commercially available carbon fibers of about several millimeters in length as starting materials. However, there is no limitation.

The average fiber length in the present invention is measured by the following method.

0.5 g of a molded piece or a pellet sample is dissolved in 100 ml of hexafluoroisopropanol at room temperature. The solid portion of the carbon fiber which is substantially not dissolved is filtered off by a glass filter of 10–16 $\mu$m in pore size and recovered. Ten enlarged photographs (30× magnification) of about 100 carbon fibers recovered as one unit are taken on a slide glass by a transmission type light microscope. The photographs are subjected to analysis acicular matters under the conditions of the sampling number of about 700–1000 by an image analyzer (IP-1000 manufactured by Asahi Kasei Kogyo K.K.) thereby to obtain the average fiber length.

The amount of the electrically conductive carbon black in the present invention must be in the range of 1.0–30 parts by weight for 100 parts by weight of the polyacetal resin, and is preferably 2.0–20 parts by weight, more preferably 2–10 parts by weight. If the amount is less than 1.0 part by weight, sufficient electrical conductivity cannot be established and if it exceeds 30 parts by weight, the inherent function of the polyacetal resin is damaged.

The amount of the carbon fiber in the present invention must be in the range of 1.0–30 parts by weight for 100 parts by weight of the polyacetal resin, and is preferably 2.0–20 parts by weight, more preferably 2–10 parts by weight. If the amount is less than 1.0 part by weight, sufficient mechanical properties cannot be exhibited, and if it exceeds 30 parts by weight, the improved mechanical effect is no longer present and this is economically not preferred.

The compositional weight ratio (B):(C) of the electrically conductive carbon black (B) and the carbon fiber (C) is 2:8–8:2, preferably 3:7–7:3, more preferably 4:6–6:4.

Mixing of the polyacetal resin with the electrically conductive carbon black and the carbon fiber is preferably carried out by melt kneading using a known extruder. As the extruder, there may be used any of known extruders such as single-screw extruder and twin-screw extruder, but the twin-screw extruder is more preferred. During melt kneading, it is necessary to add simultaneously the electrically conductive carbon black and the carbon fiber to the polyacetal resin which is kept at the melting point, followed by kneading. Specifically, the polyacetal resin is fed from a main feed opening of the extruder, and the electrically conductive carbon black and the carbon fiber are simultaneously added from a side feed opening provided downstream the position at which the resin is in molten state, followed by mixing.

The following methods are not preferred. A method of main-feeding the polyacetal resin, the electrically conductive carbon black, and the carbon fiber which are collectively mixed, a method of main-feeding the polyacetal resin and the electrically conductive carbon black and side-feeding the carbon fiber, and a method of main-feeding the polyacetal resin and the carbon fiber and side-feeding the electrically conductive carbon black are not preferred because the desired electrical conductivity and mechanical properties cannot be obtained.

The melt kneading temperature may be selected within the range higher than the melting point of the polyacetal resin and lower than the temperature at which point decomposition occurs of the polyacetal resin at the time of melt kneading, and is preferably 200–240° C. If the temperature is lower than 200° C., the structure of the electrically conductive carbon black is developed with difficulty and sufficient electrical conductivity cannot be obtained. If the temperature is higher than 240° C., the polyacetal resin decomposes, resulting in reduction of mechanical strength. The temperature is more preferably 220–240° C.

When a lubricant is additionally contained in the composition of the present invention, the releasability is further improved. The lubricants used in the present invention may be conventional ones and has no limitation. Preferred are alkali metal salts or alkaline earth metal salts of aliphatic carboxylic acids, amide compounds such as ethylenebisstearylamide, and aliphatic alcohols such as stearyl alcohol and behenyl alcohol. More preferred are alkali metal salts or alkaline earth metal salts of aliphatic carboxylic acids. Amount of the lubricant added must be in the range of 0.001–5 parts by weight per 100 parts by weight of the polyacetal resin. If the amount is less than 0.001 part by weight, sufficient releasability is not exhibited, and if it exceeds 5 parts by weight, the electrical conductivity is damaged owing to the lubricant which oozes out to the surface of the molded articles.

For the addition of the lubricant in the present invention, the polyacetal resin, the electrically conductive carbon black, and the carbon fiber are melt kneaded by a known extruder or the like and then pelletized or solidified, and the lubricant may be physically adhered (if necessary, using an adhesive) to the pellets or the solidified product, or the lubricant may be melt kneaded with the polyacetal resin, the electrically conductive carbon black, and the carbon fiber, and either of these methods can be preferably used. In the case of using the lubricant by melt kneading with the polyacetal resin, the electrically conductive carbon black, and the carbon fiber, it is preferred that the polyacetal resin, the electrically conductive carbon black, and the carbon fiber are previously melt kneaded and thereafter the lubricant is melt kneaded therewith. This is because the affinity between the polyacetal resin and the carbon fiber increases, and the effect of the present invention is further exhibited.

The composition of the present invention may further contain additives commonly used for polyacetal resin compositions, for example, amino-substituted triazine compounds such as guanamine (2,4-diamino-"sym"-triazine), melamine (2,4,6-triamino-sym-triazine), N-butylmelamine, N-phenylmelamine, N,N-diallylmelamine, N,N',N"-triphenylmelamine, benzoguanamine (2,4-diamino-6-phenyl-sym-triazine), 2,4-diamino-6-methyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine (ammelite), 2-oxy-4,6-diamino-sym-triazine (ammeline), N,N',N'-tetracyanoethylbenzoguanamine, and methylolmelamine; hindered phenol antioxidants such as n-octadecyl-3-(3',5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), triethylene glycol-bis-(3-(3-t-butyl-5-methyl-4-hydroxyphenyl)-propionate), pentaerythrityl-tetrakis-(3-(3,5-di-t-butyl-4-hydroxyphenyl)-propionate), 3,9-bis-(2-(3-(3-t-butyl-4-hydroxy-5-methylphenyl)-propionyloxy)-1,1-dimethylethyl)2,4,8,10-tetraoxaspiro(5,5)undecane, N,N'-bis-3-(3',5'-di-t-butyl-4-hydroxyphenol) propionylhexamethylenediamine, N,N'-tetramethylenebis-3-(3'-methyl-5'-t-butyl-4-hydroxyphenol)propionyldiamine, N,N'-bis-(3-(3,5-di-t-butyl-4-hydroxyphenol)propionyl) hydrazine, N-salicyloyl-N'-salicylidenehydrazine, 3-(N-salicyloyl)amino-1,2,4-triazole, and N,N'-bis(2-(3-(3,5-di-butyl-4-hydroxyphenyl)propionyloxy)ethyl)oxyamide; ultraviolet absorbers such as 2-(2'-hydroxy-5'-methyl-phenyl)benzotriazole, 2-(2'-hydroxy-3',5'-di-t-butyl-phenyl) benzotriazole, 2-(2'-hydroxy-3',5'-diisoamyl-phenyl) benzotriazole, 2-(2'-hydroxy-3',5'-bis-(α,α-dimethylbenzyl) phenyl)-benzotriazole, and 2-(2'-hydroxy-4'-octoxyphenyl) benzotriazole; hindered amine light stabilizers such as bis (2,2,6,6-tetramethyl-4-piperidyl)carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-adipate, bis(2,2,6,6-tetramethyl-4-piperidyl)-sebacate, and bis(2,2,6,6-tetramethyl-4-piperidyl)-terephthalate; poly-alkylene glycols such as polyethylene glycol; polymers containing formaldehyde reactive nitrogen or compounds thereof such as nylon 6,6; inorganic metal salts such as calcium carbonate, calcium chloride, and calcium hydroxide; and nucleating agents such as boron nitride. Furthermore, for the purpose of improving heat stability, the composition of the present invention may optionally contain epoxy compounds such as condensates of cresol novolak and epichlorohydrin, trimethylolpropanetriglycidyl ether, propylene glycol diglycidyl ether, stearylglycidyl ether, glycerindiglycidyl ether, pentaerythritoltetraglycidyl ether, 2-methyloctylglycidyl ether, hydrogenated bisphenol A diglycidyl ether, polypropylene glycol diglycidyl ether, and polyethylene glycol diglycidyl ether; organic phosphorus compounds such as triphenylphosphine; and the like. These additives may be previously added to the polyacetal resin or may be added at the time of melt kneading of the electrically conductive carbon black and the carbon fiber.

The polyacetal resin composition of the present invention can be molded by known molding methods employed for polyacetal resins, and is molded preferably by injection molding, extrusion molding, blow molding, press molding, gas-assisting injection and the like.

The polyacetal resin composition of the present invention is excellent in electrical conductivity, mechanical properties and releasability, and can be used for working parts or exterior parts of automobiles, electrical and electronic apparatuses, and other industrial machines. Especially, it is useful as bracket materials of in-tank type fuel transfer pump apparatuses among automobile components.

The present invention will be explained in more detail by the following examples, but the present invention is never limited to these examples.

In the examples and comparative examples, average fiber length of the carbon fiber, electrical conductivity, tensile strength, flexural modulus, and releasability were evaluated by the following methods.

(1) Average Fiber Length

About 0.5 g of a molded piece or pellet sample was dissolved in about 100 ml of hexafluoroisopropanol at room temperature. Carbon fibers which were not dissolved and precipitated were filtered by a glass filter of 10–16 μm in pore size and recovered. Ten enlarged photographs (30× magnification) of about 100 carbon fibers recovered, as one unit, were taken on a slide glass by a transmission type light microscope. The photographs were subjected to analysis acicular matters under the conditions of the sampling number of about 700–1000 by an image analyzer (IP-1000 manufactured by Asahi Kasei Kogyo K.K.). The resulting number-average length was employed as the average fiber length.

(2) Electrical Conductivity

The electrical conductivity was expressed by volume resistivity (Ω cm). The volume resistivity was measured by ROLESTER HP (manufactured by Mitsubishi Chemical Co., Ltd.). First, both end pins of a four probe instrument (ASP probe) were pressed onto the points present at the center in the width direction and 40 mm and 55 mm from the gate side in the lengthwise direction of a test specimen (125 mm×12.7 mm×3 mm) prepared for measurement of flexural modulus, thereby to measure the volume resistivity. Similarly, volume resistivities were measured at the points of 45 mm and 60 mm, 50 mm and 65 mm, 55 mm and 70 mm, and 60 mm and 75 mm, and the average value of the measured values was employed as a volume resistivity of the test piece.

(3) Tensile Strength

This was measured in accordance with ASTM-D638

(4) Flexural Modulus This was measured in accordance with ASTM-D790.

(5) Releasability

In the course of molding the pellets using an injection molding machine into a cup-shaped molded article having a height of 50 mm, a tube diameter of 50 mm, a thickness of bottom disk of 3 mm, an average thickness of tube wall of 1.8 mm, and a draft taper of 0.5°, when the cup-shaped molded article was ejected, the load was detected by a load cell built in the ejector plate, and the load value was defined as a releasing force. The smaller load value of the load cell means better releasability.

The starting materials used in the examples and the comparative examples and the abbreviations employed in Tables 1 and 2 are shown below.

(A) Polyacetal resin
  A-1: Polyacetal resin copolymer (TENACK-C4510 (MI 9.5 g/10 min) manufactured by Asahi Kasei Kogyo K.K.)
(B) Electrically Conductive Carbon Black
  B-1: Ketzen Black EC (Trademark: manufactured by Lion Co., Ltd.)
(C) Carbon Fibers
  C-1: PYROFILL TR066C2E (Trademark: manufactured by Mitsubishi Rayon Co., Ltd.); adjusted to 225 μm in average fiber length.
  C-2: PYROFILL TR066C2E (Trademark: manufactured by Mitsubishi Rayon Co., Ltd.); adjusted to 200 μm in average fiber length.
  C-3: PYROFILL TR066C2E (Trademark: manufactured by Mitsubishi Rayon Co., Ltd.); adjusted to 180 μm in average fiber length.
  C-4: PYROFILL TRO66C2E (Trademark: manufactured by Mitsubishi Rayon Co., Ltd.); adjusted to 100 μm in average fiber length.
  C-5: PYROFILL TR066C2E (Trademark: manufactured by Mitsubishi Rayon Co., Ltd.); adjusted to 420 μm in average fiber length.
  C-6: PYROFILL TR066C2E (Trademark: manufactured by Mitsubishi Rayon Co., Ltd.); average fiber length: 6.1 mm.
(D) Lubricant
  D-1: Calcium stearate
(E) Other Components
  E-1: o-Cresol novolak type epoxy resin (Trademark: ARALDITE-ECN1299; manufactured by Asahi-Ciba Co., Ltd.)
  E-2: Triphenylphosphine
  E-3: Dicyandiamide

EXAMPLE 1

Using a 25 mmφ twin-screw extruder having a side feed opening set at a cylinder temperature of 230° C., 100 parts by weight of (A-1) was fed from a main feed opening and 5.0 parts by weight of (B-1) and 5.0 parts by weight of (C-1) were fed from a side feed opening provided downstream, and these materials were melt kneaded under the conditions of a revolution speed of 100 rpm and a discharging amount of 10 Kg/Hr, and then pelletized. In this case, conditions were set so that (A-1) was in molten state at the side feed opening, and vacuum deaeration was carried out under –400 mmHg from a vent port provided downstream the side feed opening. Results of a series of evaluations on the resulting pellets are shown in Table 1.

EXAMPLE 2

The same procedure as of Example 1 was carried out, except that a uniform mixture of 100 parts by weight of (A-1) and 0.1 part by weight of (E-3) was fed from the main feed opening. The results are shown in Table 1.

EXAMPLE 3

The same procedure as of Example 1 was carried out, except that a uniform mixture of 100 parts by weight of (A-1) and 1.0 part by weight of (E-2) was fed from the main feed opening, and 5.0 parts by weight of (B-1), 6.0 parts by weight of (C-2), and 2.0 parts by weight of (E-1) were fed from the side feed opening. The results are shown in Table 1.

EXAMPLE 4

The same procedure as of Example 1 was carried out, except that 4.0 parts by weight of the component (C-3) was used in place of 5.0 parts by weight of the component (C-1). The results are shown in Table 1.

Comparative Example 1

The same procedure as of Example 1 was carried out, except that the component (C-4) was used in place of the component (C-1). The results are shown in Table 1.

Comparative Example 2

The same procedure as of Example 1 was carried out, except that the component (C-5) was used in place of the component (C-1). The results are shown in Table 1.

Comparative Example 3

The same procedure as of Example 1 was carried out, except that the component (C-1) was not added. The results are shown in Table 1.

Comparative Example 4

The same procedure as of Comparative Example 3 was carried out, except that the amount of the component (B-1) was changed to 10 parts by weight. The results are shown in Table 1.

Comparative Example 5

The same procedure as of Example 1 was carried out, except that the component (B-1) was not added. The results are shown in Table 1.

Comparative Example 6

The same procedure as of Comparative Example 3 was carried out, except that the amount of the component (C-1) was changed to 10 parts by weight. The results are shown in Table 1.

Comparative Example 7

Using a 25 mmφ twin-screw extruder having a side feed opening set at a cylinder temperature of 230° C., a uniform mixture of 100 parts by weight of (A-1) and 5.0 parts by weight of (B-1) was fed from a main feed opening, and 5.0 parts by weight of (C-1) was fed from a side feed opening provided downstream, and these materials were melt kneaded under the conditions of a revolution speed of 100 rpm and a discharging amount of 10 Kg/Hr, and then pelletized. In this case, conditions were set so that (A-1) was in molten state at the side feed opening, and vacuum deaeration was carried out under −400 mmHg from a vent port provided downstream the side feed opening. Results of a series of evaluations on the resulting pellets are shown in Table 2.

Comparative Example 8

Using a 25 mmφ twin-screw extruder having a side feed opening set at a cylinder temperature of 230° C., a uniform mixture of 100 parts by weight of (A-1) and 5.0 parts by weight of (C-1) was fed from a main feed opening, and 5.0 parts by weight of (B-1) was fed from the side feed opening provided downstream, and these materials were melt kneaded under the conditions of a revolution speed of 100 rpm and a discharging amount of 10 Kg/Hr, and then pelletized. In this case, conditions were set so that (A-1) was in molten state at the side feed opening, and vacuum deaeration was carried out under −400 mmHg from a vent port provided downstream the side feed opening. Results of a series of evaluations on the resulting pellets are shown in Table 2.

Comparative Example 9

Using a 25 mmφ twin-screw extruder having a side feed opening set at a cylinder temperature of 230° C. (the side feed opening was closed), 100 parts by weight of (A-1), 5.0 parts by weight of (B-1) and 5.0 parts by weight of (C-1) were fed from a main feed opening, and melt kneaded under the conditions of a revolution speed of 100 rpm and a discharging amount of 10 Kg/Hr, and then pelletized. Vacuum deaeration was carried out under −400 mmHg from a vent port provided downstream the side feed opening. Results of a series of evaluations on the resulting pellets are shown in Table 2.

EXAMPLE 5

The pellets prepared in Example 1 were mixed with calcium stearate (D-1) in an amount as shown in Table 2, and the mixture was stirred by a tumbler. The resulting polyacetal resin compositions were subjected to the same evaluations as in Example 1. The results are shown in Table 2.

EXAMPLE 6

Using a 25 mmφ twin-screw extruder having side feed openings at two positions set at a cylinder temperature of 230° C., 90 parts by weight of (A-1) was fed from a main feed opening, and 5.0 parts by weight of (B-1) and 5.0 parts by weight of (C-1) were fed from a side feed opening ① provided downstream, and, furthermore, 0.05 part by weight of (D-1) and 10 parts by weight of (A-1) were fed from a side feed opening ②, and these materials were melt kneaded under the conditions of a screw revolution speed of 100 rpm and a discharging amount of 10 Kg/Hr, and then pelletized. In this case, conditions were set so that (A-1) was in molten state at the side feed opening, and vacuum deaeration was conducted under −400 mmHg from a vent port provided further downstream the side feed opening ②. Results of a series of evaluations on the resulting pellets are shown in Table 2.

EXAMPLE 7

Using a 65 mmφ twin-screw extruder having a side feed opening set at a cylinder temperature of 220° C., 101.1 parts by weight of a mixture obtained by uniformly mixing 100 parts by weight of (A-1), 0.1 part by weight of (E-3) and 1.0 part by weight of (E-2) was fed from a main feed opening, and 5.0 parts by weight of (B-1), 5.0 parts by weight of (C-6), and 2.0 parts by weight of (E-1) were fed from the side feed opening provided downstream, and these materials were melt kneaded under the conditions of a revolution speed of 250 rpm and a discharging amount of 200 Kg/Hr, and then pelletized. In this case, conditions were set so that (A-1) was in a molten state at the side feed opening, and vacuum deaeration was carried out under −400 mmHg from a vent port provided further downstream the side feed opening. Results of a series of evaluations on the resulting pellets are shown in Table 2.

EXAMPLE 8

The pellets prepared in Example 7 were mixed with calcium stearate (D-1) in an amount as shown in Table 2, and the mixture was stirred by a tumbler. The resulting polyacetal resin compositions were subjected to the same evaluations as in Example 7. The results are shown in Table 2.

EXAMPLE 9

Using a 65 mmϕ twin-screw extruder having side feed openings at two positions set at a cylinder temperature of 220° C., 96.1 parts by weight of a mixture obtained by uniformly mixing 95 parts by weight of (A-1), 0.1 part by weight of (E-3), and 1.0 part by weight of (E-2) was fed from a main feed opening, and 5.0 parts by weight of (B-1), 5.0 parts by weight of (C-1), and 2 parts by weight of (E-1) were fed from a side feed opening ① provided downstream, and, furthermore, 0.1 part by weight of (D-1) and 5 parts by weight of (A-1) were fed from a side feed opening ②, and these materials were melt kneaded under the conditions of a screw revolution speed of 250 rpm and a discharging amount of 200 Kg/Hr, and then pelletized. In this case, conditions were set so that (A-1) was in a molten state at the side feed openings, and vacuum deaeration was carried out under −400 mmHg from a vent port provided further downstream the side feed opening ②. Results of a series of evaluations on the resulting pellets are shown in Table 2.

EXAMPLE 10

Using a 65 mmϕ twin-screw extruder having a side feed opening set at a cylinder temperature of 220° C., 101.1 parts by weight of a mixture obtained by uniformly mixing 100 parts by weight of (A-1), 0.1 part by weight of (E-3) and 1.0 part by weight of (E-2) was fed from a main feed opening, and 5.0 parts by weight of (B-1), 5.0 parts by weight of (C-6), 2.0 parts by weight of (E-2), and 0.05 part by weight of (D-1) were fed from the side feed opening provided downstream, and these materials were melt kneaded under the conditions of a revolution speed of 250 rpm and a discharging amount of 200 Kg/Hr, and then pelletized. In this case, conditions were set so that (A-1) was in a molten state at the side feed opening, and vacuum deaeration was carried out under −400mmHg from a vent port provided further downstream the side feed opening. Results of a series of evaluations on the resulting pellets are shown in Table 2.

Comparative Example 10

The same procedure as of Example 7 was carried out, except that the component (B-1) was not added. The results are shown in Table 2.

Comparative Example 11

The pellets prepared in Comparative Example 10 were mixed with (D-1) in an amount as shown in Table 2, and the mixture was stirred by a tumbler. The resulting polyacetal resin compositions were subjected to the same evaluations as in Comparative Example 10. The results are shown in Table 2.

INDUSTRIAL APPLICABILITY

The polyacetal resin compositions of the present invention are excellent in electrical conductivity, mechanical properties and releasability, and can be used for automobiles, electronic electric apparatuses and working or external parts of industrial machines. Especially, they are useful as bracket materials of in-tank type fuel transfer pump apparatuses in automobiles.

TABLE 1

|  |  | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Polyacetal resin | Kind | A-1 | A-1 | A-1 | A-1 | A-1 | A-1 | A-1 | A-1 | A-1 | A-1 |
|  | Amount | 100 | 100 | 100 | 100 | 100 | 100 | 100 | 100 | 100 | 100 |
| Electrically conductive carbon black | Kind | B-1 | B-1 | B-1 | B-1 | B-1 | B-1 | B-1 | B-1 |  |  |
|  | Amount | 5.0 | 4.0 | 5.0 | 5.0 | 5.0 | 5.0 | 5.0 | 10.0 |  |  |
| Carbon fiber | Kind | C-1 | C-1 | C-2 | C-3 | C-4 | C-5 |  |  | C-1 | C-1 |
|  | Amount | 5.0 | 5.0 | 6.0 | 4.0 | 5.0 | 5.0 |  |  | 5.0 | 10.0 |
| Other additives | Kind |  | E-3 | E-1 |  |  |  |  |  |  |  |
|  | Amount |  | 0.1 | 2.0 |  |  |  |  |  |  |  |
|  | Kind |  |  | E-2 |  |  |  |  |  |  |  |
|  | Amount |  |  | 1.0 |  |  |  |  |  |  |  |
| Average fiber length of CF in pellets (μm) |  | 220 | 223 | 195 | 178 | 98 | 420 | — | — | 218 | 180 |
| Volume resistivity (Ω cm) |  | $4 \times 10^2$ | $7 \times 10^2$ | $3 \times 10^2$ | $2 \times 10^2$ | $1 \times 10^2$ | $1 \times 10^6$ | $1 \times 10^5$ | $1 \times 10^2$ | $2 \times 10^6$ | $3 \times 10^4$ |
| Tensile strength (kgf/cm$^2$) |  | 790 | 780 | 800 | 760 | 600 | 780 | 520 | 520 | 800 | 1190 |
| Average fiber length of CF in tensile specimen (μm) |  | 218 | 220 | 198 | 177 | 96 | 423 | — | — | 220 | 182 |
| Flexural modulus (kgf/cm$^2$) |  | 53,000 | 52,500 | 55,500 | 48,000 | 32,000 | 53,000 | 24,000 | 26,000 | 52,000 | 76,000 |
| Average fiber length of CF in flexural modulus specimen (μm) |  | 221 | 219 | 197 | 178 | 97 | 418 | — | — | 219 | 184 |
| Releasing factor (kg) |  | 98 | 108 | 110 | 96 | 95 | 97 | 94 | 98 | 174 | 190 |

(The amount is part by weight based on the polyacetal resin.)

TABLE 2

| | | Comparative Example 7 | Comparative Example 8 | Comparative Example 9 | Example 5 | Example 6 | Example 7 | Example 8 | Example 9 | Example 10 | Comparative Example 10 | Comparative Example 11 |
|---|---|---|---|---|---|---|---|---|---|---|---|---|
| Polyacetal resin | Kind | A-1 | A-1 | A-1 | A-1 | A-1 | A-1 | A-1 | A-1 | A-1 | A-1 | A-1 |
| | Amount | 100 | 100 | 100 | 100 | 100 | 100 | 100 | 100 | 100 | 100 | 100 |
| Electrically conductive carbon black | Kind | B-1 | B-1 | B-1 | B-1 | B-1 | B-1 | B-1 | B-1 | B-1 | | |
| | Amount | 5.0 | 5.0 | 5.0 | 5.0 | 5.0 | 5.0 | 5.0 | 5.0 | 5.0 | | |
| Carbon fiber | Kind | C-1 | C-1 | C-1 | C-1 | C-1 | C-6 | C-6 | C-6 | C-6 | C-6 | C-6 |
| | Amount | 5.0 | 5.0 | 5.0 | 5.0 | 5.0 | 5.0 | 5.0 | 5.0 | 5.0 | 5.0 | 5.0 |
| Lubricant | Kind | | | | D-1 | D-1 | | D-1 | D-1 | D-1 | | D-1 |
| | Amount | | | | 0.05 | 0.05 | | 0.05 | 0.05 | 0.05 | | 0.05 |
| Other additives | Kind | | | | | | E-1 | E-1 | E-1 | E-1 | E-1 | E-1 |
| | Amount | | | | | | 2.0 | 2.0 | 2.0 | 2.0 | 2.0 | 2.0 |
| | Kind | | | | | | E-2 | E-2 | E-2 | E-2 | E-2 | E-2 |
| | Amount | | | | | | 1.0 | 1.0 | 1.0 | 1.0 | 1.0 | 1.0 |
| | Kind | | | | | | E-3 | E-3 | E-3 | E-3 | E-3 | E-3 |
| | Amount | | | | | | 0.1 | 0.1 | 0.1 | 0.1 | 0.1 | 0.1 |
| Average fiber length of CF in pellets ($\mu$m) | | 215 | 95 | 92 | 221 | 210 | 220 | 230 | 210 | 210 | 230 | 230 |
| Volume resistivity ($\Omega$ cm) | | $3 \times 10^5$ | $1 \times 10^4$ | $3 \times 10^4$ | $4 \times 10^2$ | $3 \times 10^2$ | $3 \times 10^2$ | $3 \times 10^2$ | $3 \times 10^2$ | $3 \times 10^2$ | $3 \times 10^6$ | $2 \times 10^6$ |
| Tensile strength (kgf/cm$^2$) | | 790 | 610 | 600 | 790 | 720 | 800 | 800 | 790 | 760 | 810 | 800 |
| Average fiber length of CF in tensile specimen ($\mu$m) | | 210 | 95 | 90 | 217 | 210 | 220 | 225 | 206 | 207 | 224 | 224 |
| Flexural modulus (kgf/cm$^2$) | | 53,000 | 33,000 | 32,000 | 53,000 | 53,000 | 55,000 | 55,500 | 55,000 | 49,000 | 53,000 | 53,500 |
| Average fiber length of CF in flexural modulus specimen ($\mu$m) | | 214 | 93 | 90 | 220 | 205 | 222 | 220 | 205 | 206 | 226 | 223 |
| Releasing factor (kg) | | 95 | 95 | 93 | 56 | 65 | 93 | 48 | 67 | 70 | 170 | 110 |

(The amount is part by weight based on the polyacetal resin.)

What is claimed is:

1. A polyacetal resin composition which comprises (A) 100 parts by weight of a polyacetal resin, (B) 1.0–30 parts by weight of an electrically conductive carbon black, and (C) 1.0–30 parts by weight of a carbon fiber, from which a vapor deposition carbon fiber is excluded, of 120–350 $\mu$m in average fiber length and 4–20 $\mu$m in diameter of fiber.

2. The polyacetal resin composition according to claim 1 which further comprises 0.001–5 parts by weight of (D) a lubricant for 100 parts by weight of the polyacetal resin.

3. The polyacetal resin composition according to claim 1 or 2, wherein the polyacetal resin is one member selected from the group consisting of oxymethylene homopolymer, oxymethylene copolymer and oxymethylene block polymer.

4. The polyacetal resin composition according to claim 1, wherein the electrically conductive carbon black has a DBP absorption of at least 200 ml/100 g.

5. The polyacetal resin composition according to claim 1, wherein the electrically conductive carbon black is in an amount of 2.0–20 parts by weight per 100 parts by weight of the polyacetal resin.

6. The polyacetal resin composition according to claim 5, wherein the amount of the electrically conductive carbon black is 2.0–10 parts by weight for 100 parts by weight of the polyacetal resin.

7. The polyacetal resin composition according to claim 1, wherein the average fiber length of the carbon fiber is 150–300 $\mu$m.

8. The polyacetal resin composition according to claim 1, wherein the carbon fiber is in an amount of 2.0–20 parts by weight per 100 parts by weight of the polyacetal resin.

9. The polyacetal resin composition according to claim 8, wherein the amount of the carbon fiber is 2.0–10 parts by weight per 100 parts by weight of the polyacetal resin.

10. The polyacetal resin composition according to claim 1, wherein the electrically conductive carbon black (B) and the carbon fiber (C) is in a compositional weight ratio (B):(C) of 2:8–8:2.

11. The polyacetal resin composition according to claim 10, wherein the compositional weight ratio (B):(C) of the electrically conductive carbon black (B) and the carbon fiber (C) is 3:7–7:3.

12. The polyacetal resin composition according to claim 11, wherein the compositional weight ratio (B):(C) of the electrically conductive carbon black (B) and the carbon fiber (C) is 4:6–6:4.

13. The polyacetal resin composition according to claim 2, wherein the lubricant is an alkali metal salt or alkaline earth metal salt of an aliphatic carboxylic acid.

14. A method for producing a polyacetal resin composition which comprises melting a polyacetal resin, adding simultaneously 1.0–30 parts by weight of an electrically conductive carbon black and 1.0–30 parts by weight of a carbon fiber to 100 parts by weight of the molten polyacetal resin to form a mixture, and kneading the mixture.

15. The method according to claim 14 which further comprises pelletization or solidification of the mixture to form a solidified product and physically adhering a lubricant to the solidified product.

16. The method according to claim 14 which further comprises melt kneading a lubricant with the mixture.

17. A molded article obtained by molding the polyacetal resin composition of claim 1.

18. An automobile component obtained by molding the polyacetal resin composition of claim 1.

19. A bracket material of an in-tank type fuel pump apparatus obtained by molding the polyacetal resin composition of claim 1.

* * * * *